US 6,587,173 B2
(12) United States Patent
Yoo et al.

(10) Patent No.: US 6,587,173 B2
(45) Date of Patent: Jul. 1, 2003

(54) MULTIDOMAIN LIQUID CRYSTAL DISPLAY DEVICE

(75) Inventors: Jang Jin Yoo, Seoul (KR); Ki Hyuk Yoon, Seoul (KR)

(73) Assignee: G. Philips LCD Co., Ltd., Seoul (KR)

( * ) Notice: Subject to any disclaimer, the term of this patent is extended or adjusted under 35 U.S.C. 154(b) by 78 days.

(21) Appl. No.: 09/916,246

(22) Filed: Jul. 30, 2001

(65) Prior Publication Data

US 2002/0063833 A1 May 30, 2002

(30) Foreign Application Priority Data

Aug. 8, 2000 (KR) .................................. 10-2000-45924

(51) Int. Cl.[7] ...................... G02F 1/1337; G02F 1/1343
(52) U.S. Cl. ......................................... 349/129; 349/143
(58) Field of Search .................................. 349/129, 143

(56) References Cited

U.S. PATENT DOCUMENTS

| | | | | |
|---|---|---|---|---|
| 6,285,431 B2 | * | 9/2001 | Lyu et al. ................... | 349/143 |
| 6,288,762 B1 | * | 9/2001 | Sasaki et al. ............... | 349/129 |
| 6,437,845 B1 | * | 8/2002 | Yamada et al. ............. | 349/129 |
| 6,462,798 B1 | * | 10/2002 | Kim et al. ................... | 349/129 |

OTHER PUBLICATIONS

Bong Gyu Rho, Jung In Han, Byung Kwan Yang and Jin Seung Kim, "A New Wide–Viewing–Angle VA–Mode LCD with a Simpler Cell Fabrication Process", IDW98, pp. 195–198.

Kyeong Hyeon Kim, Kyehun Lee, Seung Beom Park, Jang keun Song, Seoknam Kim and Jun Hyung Souk, "Domain Divided Vertical Alignment Mode with Optimized Fringe Field Effect", Asia Display 98, pp. 383–386.

V.A. Konovalov, A1.A. Muravski, C.N. Timofeev, S. Ye Yakovenkom, "Multi–Domain Vertically Aligned Mode", SID 98 Digest, pp. 1127–1130.

* cited by examiner

Primary Examiner—Robert H. Kim
Assistant Examiner—Jeanne Di Grazio
(74) Attorney, Agent, or Firm—Morgan, Lewis & Bockius LLP

(57) ABSTRACT

The present invention relates to a multidomain liquid crystal display device that is capable of appropriately adjusting the angle of the boundary line of a slit formed on one substrate and the pitch of liquid crystal to thereby obtain multidomain for a main viewing angle on each of domains, thereby allowing a simplified manufacturing process and improving the viewing angle and transmissivity. The multidomain liquid crystal display device includes first and second substrates, the first substrate having a plurality of pixel areas, a transparent conductive layer on each pixel area of the first substrate and having at least one or more slits inclined at a prescribed angle with respect to a boundary of the pixel area, and a liquid crystal layer between the first and second substrates.

22 Claims, 3 Drawing Sheets

| | |
|---|---|
| ◆ twist = 0° | ● twist = 50° |
| ■ twist = 10° | + twist = 60° |
| ▲ twist = 20° | twist = 70° |
| ✕ twist = 30° | twist = 80° |
| ✱ twist = 40° | ◆ twist = 90° |

MULTIDOMAIN LIQUID CRYSTAL DISPLAY DEVICE

The present invention claims the benefit of Korean Patent Application No. P 2000-45924 filed in Korea on Aug. 8, 2000, which is hereby incorporated by reference.

BACKGROUND OF THE INVENTION

1. Field of the Invention

The present invention relates to a liquid crystal display device (hereinafter, referred to as LCD), and relates more particularly to a multidomain LCD having a simplified manufacturing process, an improved viewing angle and increased transmissivity.

2. Description of Related Art

When manufacturing LCD devices, the aim is to provide a vivid viewing screen that does not fatigue a user's eyes.

A LCD is comprised of two substrates that face each other with liquid crystal injected between the two substrates. A LCD generally uses a liquid crystal having a twisted nematic (hereinafter, referred to as TN) mode. The liquid crystal has different refractive anisotropy between the light propagating in a direction of the longitudinal axes of liquid crystal molecules ($n_{11}$) and the light propagating in a direction perpendicular to the direction of the longitudinal axes ($n_\perp$). This difference results in a viewing angle that is substantially narrow.

Many solutions for addressing the problem of a narrow viewing angle in a LCD have been proposed, examples of which are as follows: a film compensated mode in which a compensating film is provided to compensate for the viewing angle; a multidomain mode in which a pixel is divided into a plurality of domains, so that the main viewing angle on the respective domains is different from each other, thereby increasing the effective viewing angle; a vertical alignment mode in which the alignment of the liquid crystal is in a vertical direction when a voltage is not applied; and an in-plane switching mode in which the liquid crystal molecules are rotated horizontally by using a parallel electric field formed by the two electrodes arranged on a single substrate.

The liquid crystal cells in which the multidomain mode is applied are a domain divided twisted nematic (DDTN) liquid crystal cell, a two-domain twisted nematic (TDTN) liquid crystal cell, a complementary twisted nematic (CTN) liquid crystal cell and a four-domain twisted nematic (FDTN) liquid crystal cell. In the case of a FDTN, the four domains are divided on the unit pixel such that the gray inversion in four directions compensate for each other, thereby providing a broader viewing angle than that of a two-domain liquid crystal cell.

The above-mentioned multidomain modes are achieved by mechanical rubbing or irradiating light on the alignment layers of the two substrates, respectively, to control both a pretilt angle and a pretilt direction so as to control the direction of the liquid crystal. In the case of mechanical rubbing, a photolithography is carried out several times. Whereas in the case of irradiating the light, the light irradiating process has to be carried out several times for each domain using a mask. Both of these process require a complicated manufacturing process.

However, the alignment treatment has not been widely used in recent years. Another method has been developed in which a slit in the electrode formed on the substrate distorts the electric field applied to the liquid crystal layer, such that the direction of the liquid crystal molecules are positioned in a desired direction. Examples of the above method are patterned vertical alignment (hereinafter, referred to as PVA) and lateral field induced vertical alignment (hereinafter, referred to as LFIVA).

The PVA is carried out with a plurality of slits formed by etching the transparent electrodes on both the upper and lower substrates, and thus, the azimuth angle of the alignment of the liquid crystal is determined by a lateral electric field generated at the time when a voltage is applied to pixels. The LFIVA is carried out with a plurality of slits formed in the pixel electrode and with the common electrode rubbed in the longitudinal directions of the slits, such that the electric field formed has horizontal components as well as vertical components.

The formation of the slits requires a patterning process comprising the steps of: forming an electrode film on the whole surface of the substrate; forming a photoresist film on the electrode film; exposing the photoresist film using a mask; etching the exposed photoresist film to form a pattern; and patterning the electrode film by using the patterned photoresist as a mask.

Vertical alignment is made in the LIFVA so that the directions of the longitudinal axes of the liquid crystal molecules are aligned vertically to the substrate surface. In more detail, the liquid crystal having a negative dielectric anisotropy is injected, so that the longitudinal axes of the liquid crystal molecules are disposed vertically on the plane of the alignment layer when no voltage is applied. On the other hand, the liquid crystal molecules move from being vertically disposed on the plane of the alignment layer to being horizontally disposed on the plane of the alignment layer when a voltage over a threshold voltage is applied.

FIG. 1 is a sectional view of related art PVA, and FIG. 2 is a sectional view of related art LFIVA.

As shown in FIG. 1, the conventional PVA comprises first and second substrates 11 and 15 facing each other with a liquid crystal layer 10 formed between the first substrate 11 and second substrate 15. The first substrate 11 has a black matrix (not shown) for preventing light-leakage, a color filter layer 13 between the black matrixes and a common electrode 14 having a plurality of slits on the color filter layer 13. The second substrate 15 has a plurality of data lines and gate lines (not shown) arranged perpendicularly to one another that define a plurality of pixel areas. Each of the pixel areas has a thin film transistor (not shown) with a gate electrode, a gate insulation film 16, a semiconductor layer, a source electrode and a drain electrode. At the cross point of the data lines and gate lines, a protective film 17 is formed on the whole surface of the thin film transistor, and a pixel electrode 18 is connected to the drain electrode of the thin film transistor on the protective film 17. The pixel electrode 18 has a plurality of slits 19.

Specifically, the plurality of slits in the common electrode 14 and the pixel electrode 18, each respectively require a patterning process.

In more detail, the first substrate 11 and second substrate 15 are first prepared. The gate lines and the gate electrode (not shown) are formed on the second substrate 15. Then, the gate insulation film 16 is formed on the gate electrode of the second substrate 15. Thereafter, a semiconductor layer (not shown) is formed on the gate insulation film 16 and subsequently the data lines are formed perpendicularly to the gate lines. At the same time, the source/drain electrodes (not shown) are formed on the semiconductor layer.

The gate lines, gate electrode, data lines and source/drain electrodes are formed of a metal having a low resistance, such as Cu, Al and Mo or an Al alloy, by sputtering and patterning. The gate insulation film 16 is formed of an inorganic material having an excellent adhesion with the above metal and a high insulation internal pressure, such as SiNx, SiOx, etc., by plasma enhanced chemical vapor deposition (PECVD).

Next, the protective film 17 of SiNx, SiOx or Benzocyclobutene (BCB) having a low dielectric constant is formed on the whole surface of the laminated layer. Then, the protective film 17 is selectively removed to expose a predetermined portion of the drain electrode to form a contact hole. Subsequently, the pixel electrode 18 made of a transparent conductive material, is formed on the protective film 17 and is electrically connected to the drain electrode through the contact hole.

Thereafter, the photoresist (not shown) is applied on the pixel electrode 18 and is patterned using photolithography. Then, the pixel electrode 18 is selectively etched using the photoresist pattern as a mask to form a plurality of slits 19 in the pixel electrode 18.

The black matrix and the color filter layer 13 are formed on the first substrate 11. Then, a transparent conductive material is deposited to thereby form the common electrode 14. In the same manner as described above, photolithography is used to form slits 19 in the common electrode 14.

The first substrate 11 and second substrate 15 are attached facing each other. Then, the liquid crystal 10 having a negative dielectric anisotropy and containing a chiral dopant is injected and the space between the first substrate 11 and second substrate 15 is sealed, thereby completing the LCD.

The common electrode 14 and the pixel electrode 18, which apply a voltage to the liquid crystal 10, are formed of indium tin oxide (hereinafter, referred to as ITO) in which 5% tin oxide is mixed. The ITO can be spray deposited on a glass substrate, deposited by vacuum deposition when the material is formed on the substrate in a vacuum vessel, or deposited by high-frequency sputtering when the material is discharged in a gas at a low pressure.

The angle (between the slit edge and the surface of the adjacent substrate edge) of the slit 19 is 90°, as shown in FIG. 1. One of the plurality of slits 19 is formed in the common electrode 14, and two are formed in the pixel electrode 18, within the unit pixel area. Since the alignment direction of the liquid crystal molecules is determined based upon the application of the electric field from the slits 19, the vertical alignment layer is applied without a rubbing process.

If a voltage over a threshold voltage is applied to the PVA-structured LCD formed as discussed above, the slit 19 cause the liquid crystal molecules initially aligned in a vertical direction to become parallel to the planar direction of the pixel electrode 18 centered around the slits 19. As a result, the directions of the main viewing angle are the same in domains A and C, and the directions of the main viewing angle are the same in the domains B and D. In other words, the unit pixel area is divided into two domains, thereby embodying a two-domain LCD.

On the other hand, as shown in FIG. 2, the LFIVA is structured in such a fashion that a plurality of slits 29 are formed only in a pixel electrode 28 on a second substrate 25. A color filter layer 23 and common electrode 24 are formed on the first substrate 21. An alignment layer 30 is applied on the common electrode 24 and are rubbed in a direction of the Y axis, i.e., the longitudinal axis of the slit 29, thereby determining an alignment direction for the liquid crystal molecules 20.

In the LFIVA structure, when no voltage is applied, the longitudinal axes of the liquid crystal molecules 20 are arranged perpendicular to the plane of the alignment layer 30. When the voltage over a threshold voltage is applied, the longitudinal axes of the liquid crystal molecules over the second substrate 25 are disposed toward the plane of the alignment layer, and the liquid crystal molecules over the first substrate 21 are aligned parallel to the rubbing direction as a result of the induced lateral electric field between the slits 29 in the pixel electrode 28. In other words, the LFIVA structure creates both the vertical electric field between electrodes 24 and 28 and the lateral electric field caused by the slits 29 in the second substrate 25 are in vertical relation with each other, thereby forming two domains centered around respective slits 29 within a unit pixel.

Therefore, the liquid crystal alignment structure that is twisted in a clockwise direction and the liquid crystal alignment structure that is twisted in a counterclockwise direction are formed with respect to the slit 29 between the two structures, thereby exhibiting the two-directional main viewing angle within the unit pixel. As a result, the gray inversion in the two directions compensates for each other, thereby exhibiting excellent transmissivity, response time and viewing angle compared to a single domain.

However, the conventionally developed multidomain LCDs have several problems.

First, a separate patterning process is required to form the slits in each of the transparent conductive layers on the first and second substrates in PVA to obtain a multidomain LCD. Therefore the manufacturing process becomes more complicated.

Secondly, the LFIVA requires mechanical rubbing of the alignment layer on the first substrate, which may generate dust or static electricity and thus degrade the quality of the device.

Third, the LFIVA does not sufficiently twist the liquid crystal molecules toward the direction of the slits, such that the transmissivity decreases in accordance with the angle of the polarization axis.

Finally, the LFIVA is a two-domain structure dependent upon the viewing direction, such that the color and contrast ratio vary depending upon the viewing direction.

SUMMARY OF THE INVENTION

The present invention is directed to a multidomain liquid crystal display device that substantially obviates one or more of the problems due to limitations and disadvantages of the related art.

It is an object of the present invention to provide a multidomain liquid crystal display device that is capable of appropriately adjusting the angle of the boundary line of a slit formed on one substrate and the pitch of liquid crystal to obtain multidomain for a main viewing angle on each of domains, resulting in a simplified manufacturing process, and improved viewing angle and transmissivity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a multidomain LCD includes: first and second substrates, the first substrate having a plurality of pixel areas, a transparent conductive layer on each pixel area of the first substrate and having at least one or more slits inclined at a prescribed angle with respect to a boundary of the pixel area, and a liquid crystal layer between the first and second substrates.

In another aspect, multidomain LCD includes first and second substrates, a plurality of data lines and a plurality of gate lines arranged substantially perpendicular to one another on the first substrate to define a plurality of pixel areas, a pixel electrode on each pixel area on the first substrate and having at least one or more slits inclined at a prescribed angle with respect to a boundary of a pixel area, first and second vertical alignment layers on the first substrate respectively, and the second substrate, and a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

The preferred embodiment of the present invention will be discussed in detail with reference to the accompanying drawings.

Figure 1:
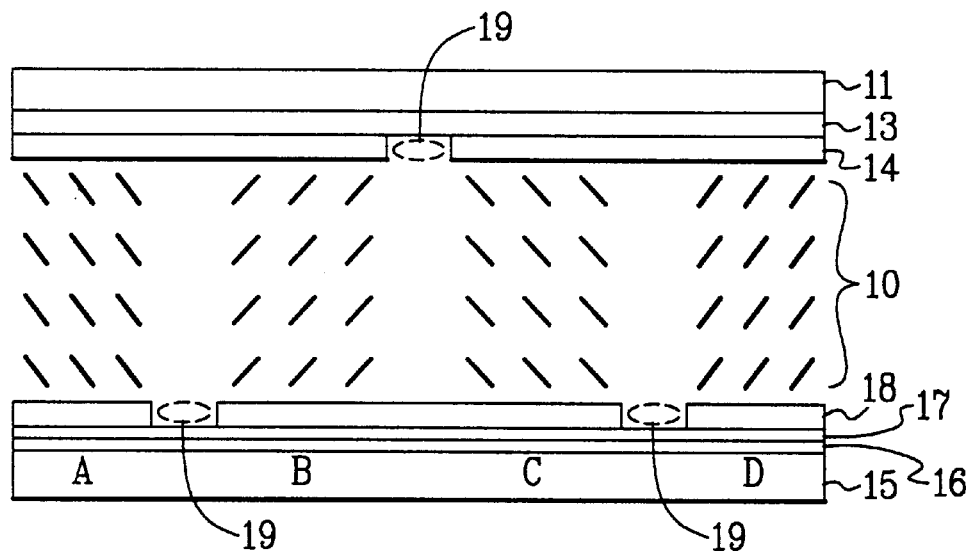
FIG. 1 is a sectional view of related art PVA.
Figure 2:
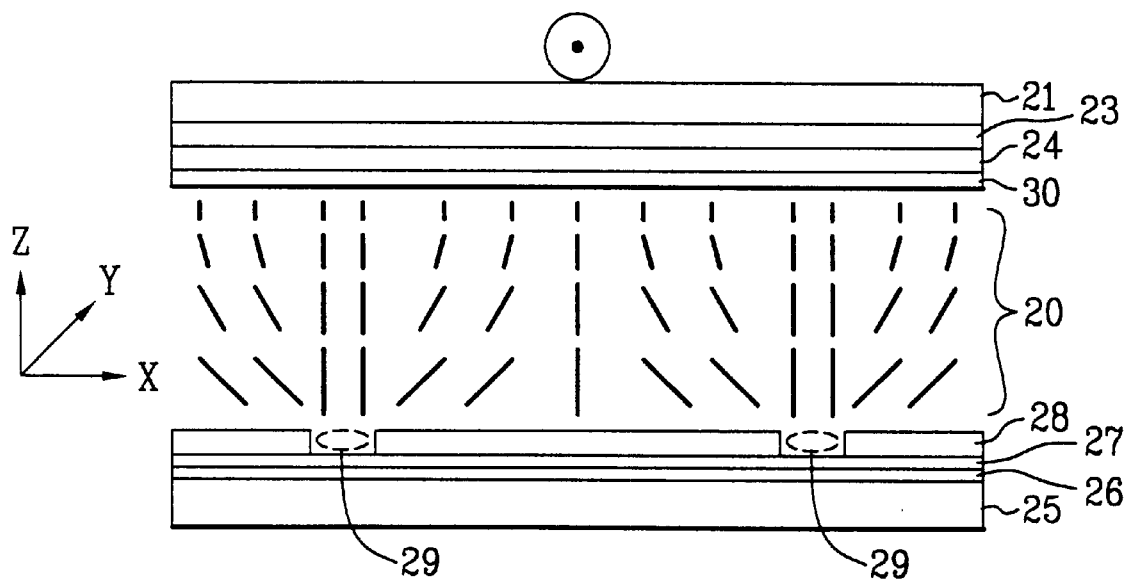
FIG. 2 is a sectional view of related art LFIVA.
Figure 3A:
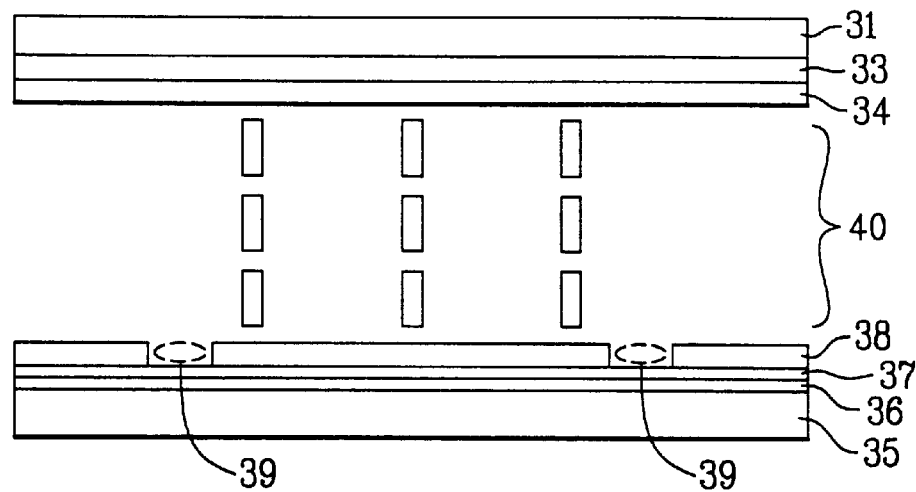
FIG. 3A is a sectional view of the LCD of the present invention when no voltage is applied.
Figure 3B:
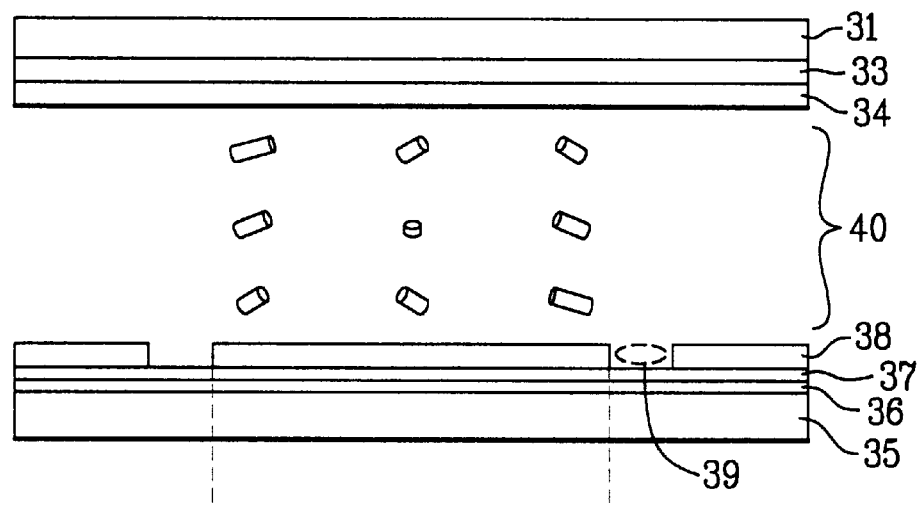
FIG. 3B is a sectional view of the LCD of the present invention when a voltage is applied and a corresponding plan view of the pixel electrode.
Figure 3B:
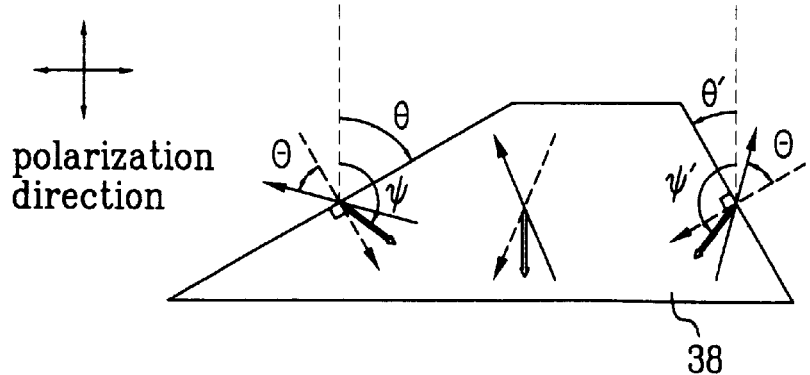
Figure 4:
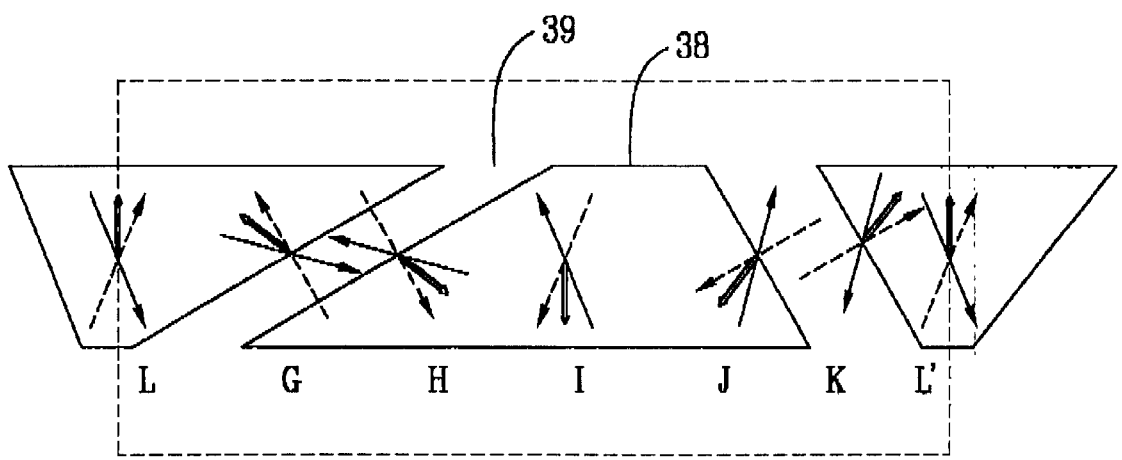
FIG. 4 is a plan view of a pixel electrode including the inclined slits in the LCD of the present invention.

FIG. 3A is a sectional view of the LCD of the present invention to which no voltage is applied, and FIG. 3B is a sectional view of the LCD of the present invention when a voltage is applied and a corresponding plan view of the pixel electrode. FIG. 4 is a plan view of a pixel electrode including inclined slits in the LCD of the present invention. The solid line arrow marks shown in FIGS. 3B and 4 represent the alignment direction of the liquid crystal on the first substrate when an electric field is applied to the upper and lower electrodes. The dotted line arrow marks represents the alignment direction of the liquid crystal on the second substrate. The thick solid line arrow marks represent the direction of the main viewing angle. When an electric field is applied to the upper and lower electrodes.

As shown in FIGS. 3A and 3B, the LCD according to the present invention comprises first and second substrates 31 and 35 facing each other, and a liquid crystal layer 30 between the first and second substrates 31 and 35. The first substrate 31 has a black matrix (not shown) on prescribed portions thereof, a color filter layer 33 within the black matrix for embodying colors R, G and B, and a common electrode 34 on the color filter layer 33. The second substrate 35 has a plurality of data lines and gate lines (not shown) arranged perpendicularly to one another that define a plurality of pixel areas. Each pixel area has a thin film transistor (not shown) having a gate electrode, a gate insulation film 36, a semiconductor layer, source electrode and drain electrode. A protective film 37 covers the whole surface of the thin film transistor. A pixel electrode 38 of a trapezoid shape connected to the drain electrode of the thin film transistor is formed with a plurality of slits 39 on the protective film 37.

The liquid crystal 40 has a negative dielectric anisotropy and the liquid crystal molecules are twisted by adding a chiral dopant. Hence, such the liquid crystal molecules obtain an alignment state similar to that of the TN liquid crystal cell when no voltage is applied.

Vertical alignment layers (not shown) are applied on the upper surfaces of the pixel electrode and the common electrode, without rubbing. In the event the liquid crystal having the negative dielectric anisotropy is used, if the vertical alignment layers are not formed, the azimuth angle on which the liquid crystal molecules lie is not predetermined. As a consequence, the liquid crystal molecules are arranged irregularly in every direction. Therefore, it is preferable that the vertical alignment layers are formed on the upper surfaces of the pixel electrode and the common electrode.

In order to manufacture the LCD according to the present invention, the first and second substrates 31 and 35 are prepared, and the black matrix is formed of a metal having an excellent light shielding property on the first substrate 31. The resists of colors of R, G and B are applied in the named order within the black matrix, thereby forming the color filter layer 33. Thereafter, ITO as a transparent conductive material is deposited on the whole surface of the color filter layer 33, thereby forming the common electrode 34.

Next, a metal layer is deposited by sputtering on the second substrate 35 and patterned to form the gate lines and the gate electrode. SiNx or SiOx is applied on the whole surface of the gate lines to form the gate insulation film 36. Subsequently, an amorphous silicon layer is formed on the gate insulation film 36 over the gate electrode and patterned to form the semiconductor layer.

Thereafter, a metal layer is vapor-deposited on the gate insulation film 36 and patterned to form the data lines and the source/drain electrodes. SiNx, SiOx or Benzocyclobutene is applied on the whole surface including the data lines to form the protective film 37.

Next, the protective film 37 is etched to form a contact hole, and ITO as a transparent conductive material is deposited in such a manner as to be connected to the drain electrode of each pixel through the contact hole. A photoresist is then applied on the ITO and patterned using a photolithography process. The ITO is selectively etched using a mask formed by the patterned photoresist to form the pixel electrode 38 of a trapezoid shape as a result of the plurality of slits 39 formed therein.

The slit patterning process is carried out only on the pixel electrode 38, and the slit is inclined when viewed in a plan view.

Subsequent to the formation of the pixel electrode 38, the vertical alignment layer are applied on the upper surfaces of the common electrode 34 and the pixel electrode 38, respectively. Finally, the first substrate 31 and the second substrate 35 are attached facing each other, and the liquid crystal 40 having a negative dielectric anisotropy and containing a chiral dopant is injected into the space between the first substrate 31 and second substrate 35, which is then sealed to complete the LCD.

When no voltage is applied to the LCD formed as described above in accordance with the present invention, the longitudinal axes of the liquid crystal molecules are aligned vertically to each substrate surface, as shown in FIG. 3A. When a voltage is applied, the liquid crystal molecules are aligned in such a manner as shown in FIG. 3B. In other words, the lateral electric field induced by the slits 39 causes the liquid crystal molecules on the second substrate 35 to aligned vertically to the slit boundary. The alignment of the liquid crystal molecules on the first substrate 31 is dependent upon the amount of the chiral dopant. As shown in FIG. 4, four domains (that is, the domains G, H, J and K) are formed centering around the slits 39. In that case, intermediate domains I, L and L' are formed between the four domains, thereby embodying the multidomain where one or more domains in addition to the four are formed.

By using the boundary condition of the slits 39, the relationships among the inclination angles $\theta$ and $\theta'$ of the slit with respect to the boundary of the pixel area, the total twist angle $\theta$ of the liquid crystal, and the main viewing angles $\Psi$ and $\Psi'$ (see FIG. 3B) are given by the following expressions:

i) left slit boundary line $$\Psi=\theta+90°-\theta/2$$

In case where $\Psi=135°$, $$\theta'+\theta/2=45° \quad (1)$$

ii) right slit boundary line $$\Psi'=\theta'+90°-\theta/2'$$

In case where $\Psi'=135°$, $$\theta'+\theta/2=45° \quad (2)$$

From the expressions (1) and (2), $$\theta+\theta'=90°$$

$$\theta'=90°-\theta>0° \quad (3)$$

From the expressions (2) and (3), $$\theta=2\theta-90°\geq0°$$

$$\theta\geq45° \quad (4)$$

From the expressions (3) and (4), $$45°\leq\theta<90° \quad 0°\leq\theta<90°$$

Within the above range, most efficient four-domain vertical alignment operates. The reason why the main viewing angle $\Psi$ is fixed at the angle of 135° is that the main viewing angle $\Psi$ has to have the angle of 45° to the polarization axis in order to obtain a maximum transmissivity because the polarization axes are at the angles of 0° and 90°. For example, if $\theta$ is 30°, $\theta'$ is 90° and the maximum transmissivity can be achieved when the total twist angle $\theta$ is 30°. The twist angle is preferably in a range of 0° to 90°, more preferably in a range of 30° to 80°.

In other words, the pitch of the liquid crystal is adjusted by an appropriate amount of the chiral dopant. Upon application of the electric field, the alignment direction of the liquid crystal molecules on the first substrate can be adjusted, wherein the desired twist angle can be obtained with a slit at an angle for the desired twist angle alignment.

The amount of chiral dopant is preferably in a range of 0.1 wt % to 1.0 wt %, more preferably in a range of 0.3 wt % to 0.8 wt %.

If the inclination angles of the slits are made as shown in FIG. 4, the main viewing angle within the unit pixel areas, where the pixel electrodes of the trapezoidal shaped, are continuously arranged in different directions in the four domains, thereby achieving the multidomain LCD.

Therefore, the adjustment of the inclination angle of the slit, the amount of the chiral dopant and the twist angle of the liquid crystal enables the directions of the main viewing angle within the unit pixel areas to be adjusted, thereby embodying the LCD having a multidomain.

Figure 5:
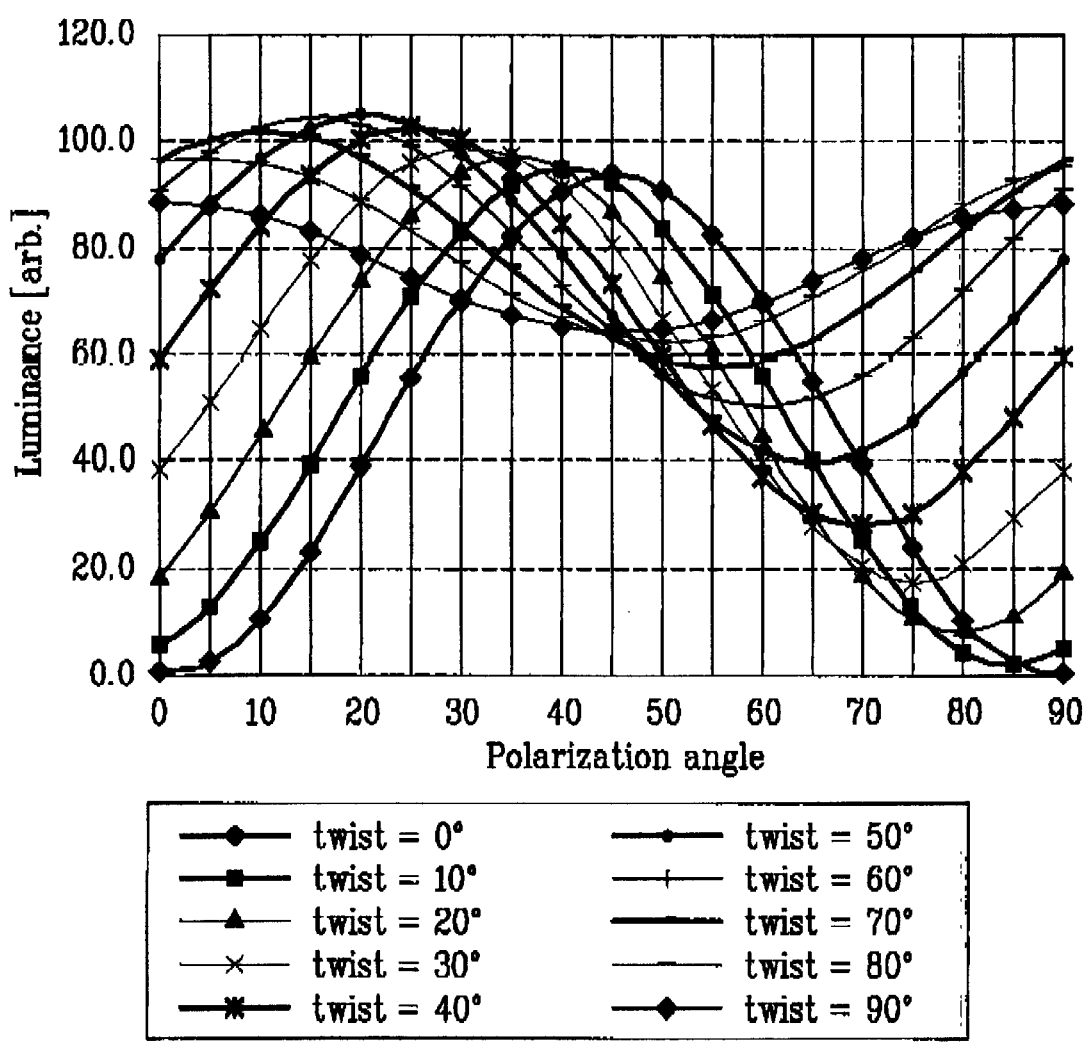
FIG. 5 is a graph of the relationship between the polarization angle and luminance in the LCD of the present invention.

FIG. 5 shows the graph illustrating the luminance according to the angle of the polarization axis, when a cell gap is 4.0 μm. As shown, when the twist angle is 90°, the variation of the luminance according to the angle of the polarization axis is relatively small.

It will be apparent to those skilled in the art that various modifications and variations can be made in the multidomain liquid crystal display of the present invention without departing from the spirit or scope of the invention. Thus, it is intended that the present invention covers the modifications and variations of this invention provided they come within the scope of the appended claims and their equivalents.

What is claimed is:

1. A multidomain liquid crystal display device comprising:

first and second substrates;

the first substrate having a plurality of pixel areas;

a transparent conductive layer on each pixel area of the first substrate, wherein the transparent conductive layer has at least a first slit at a first prescribed angle with respect to a boundary of the pixel area and a second slit at a second prescribed angle with respect to a boundary of the pixel area such that a trapezoidal shape is formed having sides that are all different lengths; and a liquid crystal layer between the first and second substrates.

2. The device of claim 1, wherein the liquid crystal layer has a negative dielectric anisotropy.

3. The device of claim 1, wherein the liquid crystal layer has a chiral dopant.

4. The device of claim 3, wherein the chiral dopant is in a range of 0.1 wt % to 1.0 wt %.

5. The device of claim 1, further comprising a vertical alignment layer on the transparent conductive layer.

6. The device of claim 1, wherein the slit has an inclination angle in a range of 45° to 90° with respect to the boundary of the pixel area.

7. The device of claim 1, further comprising a plurality of data lines and gate lines crossing each other and defining a plurality of pixel areas; and thin film transistors at the intersections of the data lines and gate lines on the first substrate.

8. The device of claim 1, wherein a twist angle of the liquid crystal layer is in a range of 0° to 90°.

9. The device of claim 1, wherein a twist angle of the liquid crystal layer is in a range of 30° to 80°.

10. A multidomain liquid crystal display device comprising:
- first and second substrates;
- a plurality of data lines and a plurality of gate lines arranged substantially perpendicular to one another on the first substrate to define a plurality of pixel areas;
- a pixel electrode on each pixel area on the first substrate, wherein the pixel electrode has at least a first slit at a first prescribed angle with respect to a boundary of the pixel area and a second slit at a second prescribed angle with respect to a boundary of the pixel area such that a trapezoidal shape is formed having sides that are all different lengths;
- first and second vertical alignment layers on the first and second substrates; and
- a liquid crystal layer between the first and second substrates.

11. The device of claim 10, wherein the liquid crystal layer has a negative dielectric anisotropy.

12. The device of claim 10, wherein the liquid crystal layer has a chiral dopant.

13. The device of claim 12, wherein the chiral dopant is in a range of 0.1 wt % to 1.0 wt %.

14. The device of claim 10, wherein the slit has an inclination angle in a range of 45° to 90° with respect to the boundary of the pixel area.

15. The device of claim 10, wherein no alignment treatment for the first and second vertical alignment layers is carried out.

16. The device of claim 10, wherein the pixel electrode is of a trapezoidal shape.

17. The device of claim 10, further comprising a color filter layer on the second substrate; and
a common electrode on the color filter layer.

18. The device of claim 10, wherein a twist angle of the liquid crystal layer is in a range of 0° to 90°.

19. The device of claim 10, wherein a twist angle of the liquid crystal layer is in a range of 30° to 80°.

20. The device of claim 10, wherein the slits have an inclination angle with respect to the boundary of the pixel area.

21. The device of claim 1, wherein the first prescribed angle plus the second prescribed angle equals 90 degrees.

22. The device of claim 10, wherein the first prescribed angle plus the second prescribed angle equals 90 degrees.

* * * * *

UNITED STATES PATENT AND TRADEMARK OFFICE
CERTIFICATE OF CORRECTION

PATENT NO. : 6,587,173 B2
DATED : July 1, 2003
INVENTOR(S) : Jang Jin Yoo and Ki Hyuk Yoon It is certified that error appears in the above-identified patent and that said Letters Patent is hereby corrected as shown below:

<u>Title page,</u>
Item [73], Assignee, please change "G. Philips LCD Co., Ltd." to
-- LG. Philips LCD Co., Ltd. --

Signed and Sealed this

Fourth Day of May, 2004

JON W. DUDAS
*Acting Director of the United States Patent and Trademark Office*